United States Patent
Postlethwaite et al.

(10) Patent No.: US 12,003,007 B2
(45) Date of Patent: Jun. 4, 2024

(54) FUEL CELL SYSTEMS AND METHODS

(71) Applicant: Ceres Intellectual Property Company Limited, Horsham (GB)

(72) Inventors: Oliver John Postlethwaite, Horsham (GB); Simone Stefano Dozio, Horsham (GB); Simone Bertoni, Horsham (GB); Paul Adrian Barnard, Horsham (GB)

(73) Assignee: Ceres Intellectual Property Company Limited, Horsham (GB)

( * ) Notice: Subject to any disclaimer, the term of this patent is extended or adjusted under 35 U.S.C. 154(b) by 0 days.

(21) Appl. No.: 17/781,341

(22) PCT Filed: Nov. 25, 2020

(86) PCT No.: PCT/EP2020/083360
§ 371 (c)(1),
(2) Date: May 31, 2022

(87) PCT Pub. No.: WO2021/110510
PCT Pub. Date: Jun. 10, 2021

(65) Prior Publication Data
US 2023/0006226 A1    Jan. 5, 2023

(30) Foreign Application Priority Data

Dec. 3, 2019 (GB) ..................... 1917649

(51) Int. Cl.
*H01M 8/04* (2016.01)
*H01M 8/04014* (2016.01)
(Continued)

(52) U.S. Cl.
CPC ..... *H01M 8/0618* (2013.01); *H01M 8/04014* (2013.01); *H01M 8/04022* (2013.01);
(Continued)

(58) Field of Classification Search
CPC ........... H01M 8/0618; H01M 8/04014; H01M 8/04022; H01M 8/04328; H01M 8/04335; H01M 8/0435
See application file for complete search history.

(56) References Cited

U.S. PATENT DOCUMENTS 5,221,586 A    6/1993 Morimoto et al.
5,968,680 A    10/1999 Wolfe et al.
(Continued)

FOREIGN PATENT DOCUMENTS

GB    2450042 A       12/2008
KR    20190076665 A    7/2019
WO    2015004419 A     1/2015

OTHER PUBLICATIONS

WIPO; International Search Report and Written Opinion dated Mar. 2, 2021 in Application No. PCT/EP2020/083360.

*Primary Examiner* — Olatunji A Godo
(74) *Attorney, Agent, or Firm* — Snell & Wilmer L.L.P.

(57) ABSTRACT

A fuel cell system comprising (i) at least one fuel cell stack (30) comprising at least one intermediate-temperature solid oxide fuel cell, and having an anode inlet (41) and a cathode inlet (61) and (ii) a reformer (70) for reforming a hydrocarbon fuel to a reformate, and a reformer heat exchanger (160); and defining: an anode inlet gas fluid flow path from a fuel source (90) to said reformer (70) to said fuel cell stack anode inlet (41); a cathode inlet gas fluid flow path from an oxidant inlet (140, 140', 140") through at least one cathode inlet gas heat exchanger (110, 150) to said reformer heat exchanger (160) to said fuel cell stack cathode inlet (61); wherein said at least one cathode inlet gas heat exchanger (110, 150) is arranged to heat relatively low temperature cathode inlet gas by transfer of heat from at least one of (i) an anode off-gas fluid flow path and (ii) a cathode off-gas fluid flow path; wherein said reformer heat exchanger is
(Continued)

arranged for heating said anode inlet gas from said relatively high temperature cathode inlet gas to a temperature $T_3$ at the anode inlet that is below a temperature $T_1$ at the cathode inlet; and wherein oxidant flow control means (200) for controlled mixing of low temperature oxidant from the or each oxidant inlet (140, 140', 140") with high temperature cathode inlet gas to control a temperature $T_1$ at the cathode inlet (61) relative to a temperature $T_3$ at the anode inlet (41) and at a level higher than $T_3$.

18 Claims, 7 Drawing Sheets

(51) Int. Cl.
*H01M 8/0432* (2016.01)
*H01M 8/04701* (2016.01)
*H01M 8/04746* (2016.01)
*H01M 8/0612* (2016.01)
*H01M 8/12* (2016.01)

(52) U.S. Cl.
CPC ... *H01M 8/04328* (2013.01); *H01M 8/04335* (2013.01); *H01M 8/0435* (2013.01); *H01M 8/04373* (2013.01); *H01M 8/04738* (2013.01); *H01M 8/04753* (2013.01); *H01M 8/04776* (2013.01); *H01M 2008/1293* (2013.01)

(56) References Cited

U.S. PATENT DOCUMENTS

2011/0129746 A1   6/2011  Yu et al.
2016/0141692 A1*  5/2016  Barnard ............ H01M 8/04022
                                                429/425

* cited by examiner

Fig. 1

Fig. 2 Co-flow reformer Basic temperatures

Fig. 3

With air bypass post reformer

FUEL CELL SYSTEMS AND METHODS

CROSS-REFERENCE TO RELATED APPLICATIONS

This application is a national stage entry of International Patent Application No. PCT/EP2020/083360, filed 25 Nov. 2020, entitled "IMPROVED FUEL CELL SYSTEMS AND METHODS," which claims priority to Great Britain Patent Application No. 1917649.4, filed on 3 Dec. 2019, the disclosures of which are hereby incorporated by reference in their entirety.

FIELD OF THE INVENTION

The present invention is concerned with improved fuel cell systems and methods.

BACKGROUND TO THE INVENTION

Teachings of fuel cells, fuel cell stacks, fuel cell stack assemblies, and heat exchanger systems, arrangements and methods are well known to one of ordinary skill in the art, and in particular include WO2015004419A, which is incorporated herein by reference in its entirety. Definitions of terms used herein can be found as necessary in the above publication. In particular, the present invention seeks to improve the systems and methods disclosed in WO2015004419A.

Operating hydrocarbon fueled SOFC (solid oxide fuel cell) systems where the fuel cell stack operates in the 450-650 Deg C. range (intermediate-temperature solid oxide fuel cell; IT-SOFC), more particularly in the 520-620 Deg C. temperature range, results in a challenging set of technical problems being encountered. Such fuel cell stack operating temperature does not lend itself to high levels of internal reforming of fuel and thus such systems typically require high levels of reforming prior to fuel reaching the fuel cell stack.

In such systems, steam reforming is used to convert a hydrocarbon fuel stream (such as natural gas) into a hydrogen-rich reformate stream which is fed to the fuel cell stack anode inlet.

To effect IT-SOFC stack cooling, air is blown over the cathode side of the fuel cell stack. To achieve the above high reformer temperature, the reformer is usually closely thermally coupled with the fuel cell stack tail-gas burner (which burns any remaining fuel in the anode off-gas in oxidant, typically by combusting with the hot cathode off-gas). In such an arrangement, the tail-gas burner and its hot exhaust gas are closely thermally coupled with the reformer by way of a heat exchanger such as a heat exchange surface. Typically, the reformer is arranged so that it is immediately adjacent to or in contact with the tail-gas burner in order that as much heat as possible is passed from the tail-gas burner to the reformer.

The delivery of fuel cell stack cooling (in particular by pumps/blowers to the cathode side of the fuel cell) is a substantial system parasitic load (typically, the largest system parasitic load).

If the fuel cell stack loses efficiency over time, it generates more heat for a given electrical output, and therefore needs more cooling. Since the fuel cell stack provides the electrical power to the pumps/blowers to provide fuel cell stack cooling this leads to an increased power demand, requiring increased power generation, in turn resulting in further increase in heat generation requiring a further increase in cooling.

Close thermal coupling of the (endothermic) fuel reformer to the tail-gas burner (TGB) means that the enthalpy of the fuel flow leaving the fuel reformer is a function of the total airflow to the fuel cell stack. With IT-SOFC degradation, the increased electrical resistance and thus increased fuel cell heat generation results in increasing reformer temperature and thus increasing hydrogen content in the reformed fuel, in turn increasing the fuel cell stack cooling load during fuel cell stack operation.

Figure 1:
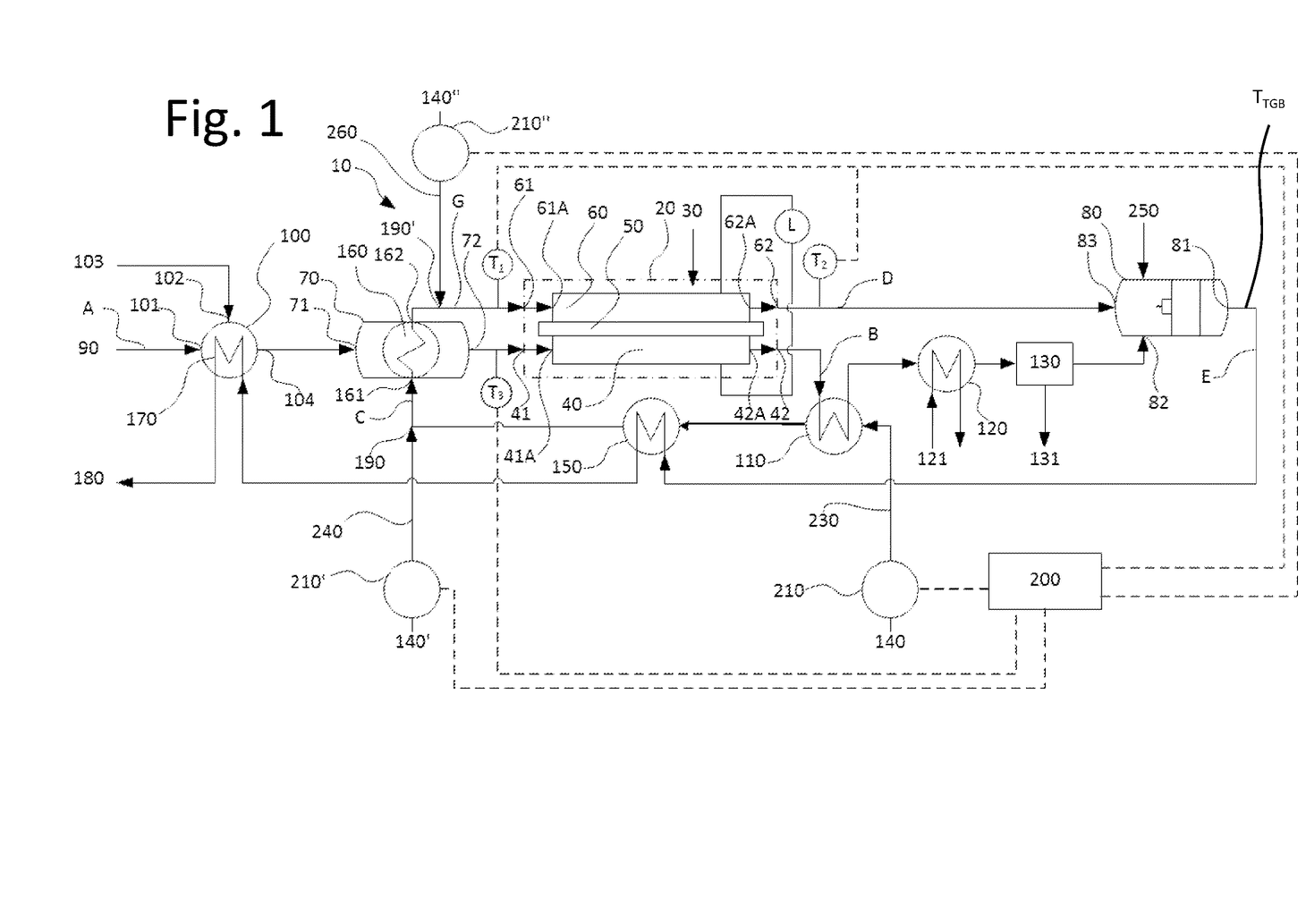
FIG. 1 shows a schematic of a fuel cell system according to the prior art.

FIG. 1 is drawn from WO2015004419A in which these and other problems are addressed by, inter alia, providing a parallel-flow reformer heat exchanger 70. Heat exchanger 70 has a relatively high temperature (primary) flow path in fluid flow communication from at least one oxidant inlet 140, 140″ to at least one fuel cell stack cathode inlet 41 and a relatively low temperature (secondary) flow path from a fuel source 71 to at least one fuel cell stack anode inlet 61. The parallel-flow heat exchanger is arranged for exchanging heat between cathode inlet gas and anode inlet gas (i.e. from the primary path to the secondary path).

WO2015004419A, describes three temperature sensors, measuring three temperatures:
 fuel cell stack cathode inlet gas temperature sensor $T_1$
 fuel cell stack cathode off-gas temperature sensor $T_2$
 anode inlet gas temperature sensor $T_3$
 tail gas burner exhaust temperature sensor $T_{TGB}$
A controller 200 maintains the temperature determined by temperature sensors T1 and T2 at or about a desired temperature during steady-state operation of the fuel cell system.

The heated inlet air stream in path C is typically 600-750 Deg C. The temperature T3 at the reformer outlet 72 is typically between 400 Deg C. and 600 Deg C.

Temperature sensor T3 is provided to control the flow rate of air in the air bypass inlet gas flow path 240 in order to maintain the temperature of the anode inlet gas at the fuel cell stack anode inlet 41 at a predetermined temperature.

Two control loops are described, a first for heating of fuel and a second for mass flow rate of oxidant-for stack cooling.

The temperature of anode inlet gas (i.e. quality of reformate) to the fuel cell stack is controlled, and this control is irrespective of variations in (and therefore heat demands exerted by) mass flow of inlet oxidant and fuel, and variations in inlet temperatures of oxidant and fuel to the fuel cell system.

The controller 200 is adapted to increase the cathode inlet gas mass flow rate if the temperature of cathode off-gas determined by the fuel cell stack cathode off-gas temperature sensor T2 is below a predetermined temperature, and vice versa.

Temperature sensor $T_{TGB}$ at the tail gas burner exhaust 81, allows for a minimum tail gas burner exhaust temperature to comply with gaseous emissions requirements. Should the tail gas burner exhaust temperature drop below this minimum value, additional unreformed fuel is supplied directly to the tail gas burner 80 from the fuel source 250 to increase the tail gas burner exhaust temperature.

Figure 2:
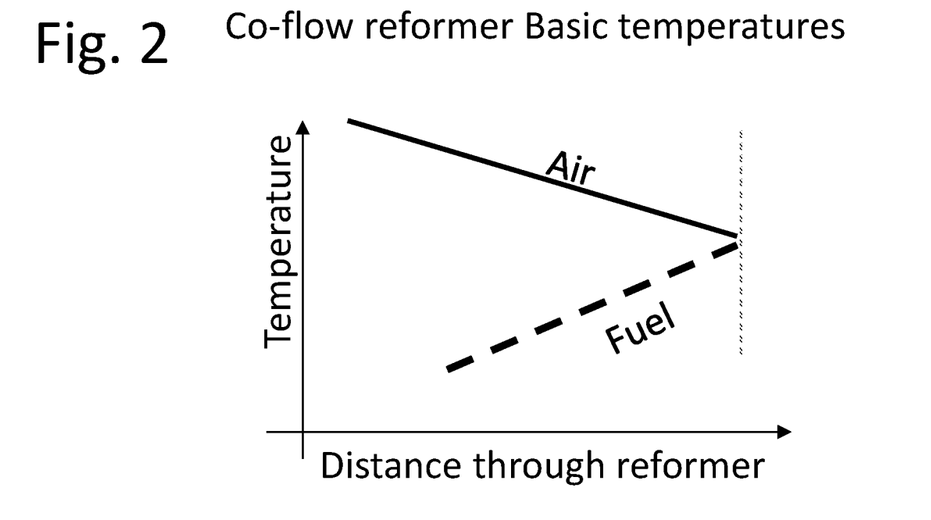
FIG. 2 is temperature sketch diagram illustrating temperature of air and fuel through the reformer of FIG. 1.

The prior art reformer heat exchanger 160 is a parallel-flow heat exchanger in which the outlet gases approach the same temperature. This is illustrated in FIG. 2. As the hot air (or oxidant) passes along the heat exchanger (illustrated by progress from left to right in the figure), it heats the fuel and the fuel temperature increases as it progresses in parallel. At the outlet, the two temperatures are approximately the same.

The fact that the reformer heat exchanger is a parallel-flow heat exchanger and is arranged for exchanging heat between the cathode and anode inlet gases prior to their entry into the at least one fuel cell means that the outlet temperature of the cathode and anode inlet gases from the reformer and the reformer heat exchanger, and hence inlet temperatures to the cathode and anode sides of the at least one fuel cell stack, are very close to one another. The temperature difference between the anode and cathode inlet gases to the at least one fuel cell is primarily determined by the performance of the reformer heat exchanger. For example, in a steady-state operation, the temperature difference between the anode and cathode inlet gases to the at least one fuel cell stack may be within 20 Deg C., more typically within 15 Deg C. of one another.

Certain embodiments in WO2015004419A provide a degree of independent control of the reformate outlet stream temperature from the reformer heat exchanger 160.

Control means 200 is connected to fuel cell stack cathode inlet gas temperature sensor T1, fuel cell stack cathode off-gas temperature sensor T2, and blowers 210 and 210'. Control means 200 is configured to maintain the temperature determined by temperature sensors T1 and T2 at or about a desired temperature during steady-state operation of the fuel cell system.

The heating of cathode inlet gas is controlled by varying the ratio of cathode inlet gas mass flow between the main cathode inlet gas flow path 230 and the air bypass inlet gas flow path 240. This is achieved by varying the relative speeds of, and hence mass flow delivered from, blowers 210 and 210'. If the temperature of cathode inlet gas measured at temperature sensor T1 is too low, the ratio of cathode inlet gas flow through air bypass inlet gas flow path 240 to cathode inlet gas flow through main cathode inlet gas flow path 230 is reduced, and vice versa.

The mass flow rate of cathode inlet gas in the fuel cell stack is the total cathode inlet gas mass flow rate from blowers 210 and 210'. If the temperature of the fuel cell stack cathode off-gas as measured at temperature sensor T2 is too high, the total mass flow of cathode inlet gas delivered by blowers 210 and 210' is increased, and vice versa.

Control means 200 is configured to maintain the temperature determined by temperature sensors T1, T2 and T3 at or about a desired temperature during steady-state operation of the fuel cell system. The air flow rate through the air bypass inlet gas flow path 260 is controlled independently of the air flow rates in both the main cathode inlet gas flow path 230 and air bypass inlet gas flow path 240. The temperature control on the reformer outlet 72 provides the ability to increase the temperature of the anode inlet gas fluid flow path A relative to the temperature of the fuel cell cathode inlet 61A. As the air bypass inlet gas flow path 260 provides air that is colder than the air leaving the reformer heat exchanger 160, the air provided by the air bypass inlet gas flow path 260 can cool, but cannot warm, the air leaving the reformer heat exchanger 160. Hence, the air bypass inlet gas flow path 260 providing cold air enables the anode inlet temperature to be higher than the cathode inlet temperature.

Increasing the temperature of the anode inlet gas at the reformer outlet 72 also increases the equilibrium temperature of the reforming reaction reached within the reformer heat exchanger 160 and hence increases the concentration of hydrogen within the anode inlet gas at the fuel cell stack anode inlet 41. Increased hydrogen concentration within the anode inlet gas will reduce the stress on the fuel cell 30 and reduce the amount of internal reforming required by the fuel cell 30.

Fuel cell stack anode inlet gas temperature sensor T3 measures the temperature of the anode gas at the fuel cell stack anode inlet 41. Controller 200 controls the flow rate of air in the air bypass inlet gas flow path 240 in order to maintain the temperature of the anode inlet gas at the fuel cell stack anode inlet 41 at a predetermined temperature. Increasing the oxidant flow rate in the air bypass inlet gas flow path 240 reduces the temperature of oxidant entering the reformer heat exchanger oxidant inlet 161. This reduction in oxidant temperature will reduce the temperature of the anode inlet gas at the reformer outlet 72 and also reduce the equilibrium temperature of the reforming reaction. On the other hand, decreasing the oxidant flow rate in the air bypass inlet gas flow path 240 increases the temperature of oxidant entering the reformer heat exchanger oxidant inlet 161. This increase in oxidant temperature increases the temperature of the anode inlet gas at the reformer outlet 72 and also increases the equilibrium temperature of the reforming reaction. The flow rate of oxidant through the air bypass inlet gas flow path 260 controls the temperature of the fuel cell cathode inlet 61A and the oxidant flow rate in the air bypass inlet gas flow path 240 controls the temperature of the reformate low from the reformer outlet 72.

Increasing the flow rate of oxidant in the air bypass inlet gas flow path 260 reduces the temperature of the oxidant stream at the fuel cell stack cathode inlet 61. Conversely, reducing the flow rate of oxidant in the air bypass inlet gas flow path 260 increases the temperature of the oxidant stream at the fuel stack cathode inlet 61.

Increasing the flow rate of the oxidant in the air bypass inlet gas flow path 240 reduces the temperature of both the anode inlet gas at the reformer outlet 72 and the cathode inlet gas at the reformer heat exchanger oxidant outlet 162. Conversely, reducing the flow rate of the oxidant in the air bypass inlet gas flow path 240 increases the temperature of both the anode inlet gas at the reformer outlet 72 and the cathode inlet gas at the reformer heat exchanger oxidant outlet 162. For example, if the control means 200 determines that the fuel cell stack anode inlet gas temperature sensor T3 is to be maintained at a higher or lower temperature, the oxidant flow rate in the air bypass inlet gas flow path 240 may be increased or decreased, respectively, by controlling blower 140'. On the other hand, if the control means 200 determines that the fuel cell stack cathode inlet gas temperature sensor T1 is to be maintained at a higher or lower temperature, the oxidant flow rate in the air bypass inlet gas flow path 240 and/or additional air bypass inlet gas flow path 260 may be increased or decreased, respectively, by controlling blower 140' for the oxidant flow rate in the air bypass inlet gas flow path 340 or blower 140" for the oxidant flow rate in the additional air bypass inlet gas flow path 260.

Figure 3:
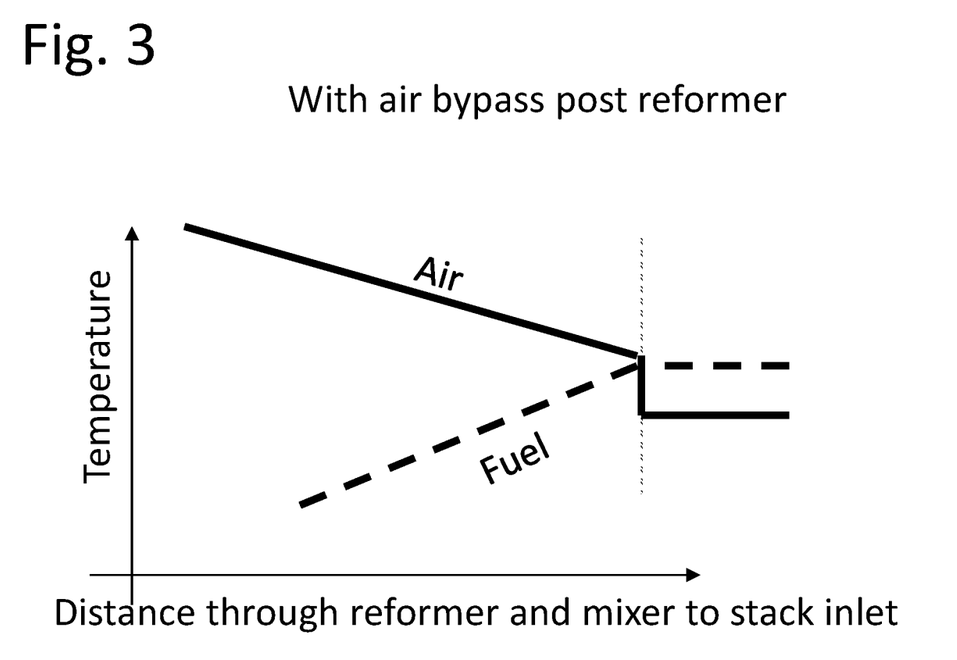
FIG. 3 is an alternative temperature sketch diagram illustrating temperature of air and fuel through the reformer of FIG. 1 in the case of post reformer air bypass.

Thus, the temperature control on the reformer outlet 72 provides the ability to decrease the temperature of the fuel cell cathode inlet 61A relative to the anode inlet gas. Air bypass inlet gas flow path 260 can provide air from source 140" that is colder than the air leaving the reformer heat exchanger 160. This is illustrated in FIG. 3. At the outlet 162 of the reformer heat exchanger, new air/oxidant from source 140" can cool (but cannot warm), the air leaving the reformer heat exchanger 160, thereby allowing the anode inlet temperature to be higher than the cathode inlet temperature (but not the reverse). Increasing the temperature of the anode inlet gas at the reformer outlet 72 increases the equilibrium temperature of the reforming reaction within the reformer heat exchanger 160 and hence increases the concentration of hydrogen within the anode inlet gas at the fuel cell stack anode inlet 41, thereby reducing the stress on the fuel cell 30 and reducing the amount of internal reforming required by the fuel cell 30.

Cooling the cathode inlet gas to the point where the anode inlet temperature is higher than the cathode inlet temperature can allow for more internal reforming in the fuel cell stack, but a lower stack air inlet temperature has a negative effect on efficiency because stack voltage drops The present invention seeks to address, overcome or mitigate at least one of the prior art disadvantages.

SUMMARY OF THE INVENTION

According to a first aspect of the present inventor, a fuel cell system (preferably an intermediate-temperature solid oxide fuel cell (IT-SOFC) system) comprising: (i) at least one fuel cell stack comprising at least one intermediate-temperature solid oxide fuel cell, and having an anode inlet, a cathode inlet, an anode off-gas outlet), and a cathode off-gas outlet; and (ii) a reformer for reforming a hydrocarbon fuel to a reformate, and having a reformer inlet for anode inlet gas, a reformer outlet for exhausting anode inlet gas, and a reformer heat exchanger; and defining: (a) an anode inlet gas fluid flow path from a fuel source to said reformer to said at least one fuel cell stack anode inlet; (b) an anode off-gas fluid flow path from said at least one fuel cell stack anode off-gas outlet to a fuel cell system exhaust; (c) a cathode inlet gas fluid flow path from an at least one oxidant inlet through at least one cathode inlet gas heat exchanger to said reformer heat exchanger to said at least one fuel cell stack cathode inlet; and (d) a cathode off-gas fluid flow path from said at least one fuel cell stack cathode off-gas outlet to said fuel cell system exhaust. The at least one cathode inlet gas heat exchanger is arranged to heat relatively low temperature cathode inlet gas by transfer of heat from at least one of (i) said anode off-gas fluid flow path and (ii) said cathode off-gas fluid flow path, to provide relatively high temperature cathode inlet gas. The reformer heat exchanger is arranged for heating said anode inlet gas from said relatively high temperature cathode inlet gas to a temperature $T_3$ at the anode inlet that is below a temperature $T_1$ at the cathode inlet. Oxidant flow control means are provided for controlled mixing of low temperature oxidant from the or each oxidant inlet with high temperature cathode inlet gas to control a temperature $T_1$ at the cathode inlet relative to a temperature $T_3$ at the anode inlet and at a level higher than $T_3$.

The oxidant flow control means are preferably arranged to control mixing of low temperature oxidant from an oxidant inlet at the cathode inlet so as to reduce the temperature $T_1$.

The oxidant flow control means may be arranged to control mixing of low temperature oxidant from an oxidant inlet at an input to the reformer heat exchanger so as to reduce the temperature $T_1$ while also reducing the temperature $T_3$.

The reformer heat exchanger preferably comprises a hot bypass for cathode inlet gas to bypass the reformer heat exchanger and contribute to elevating said cathode inlet gas to temperature $T_1$ at the cathode inlet.

In some arrangements, the hot bypass comprises a pre-set restrictor (e.g. with a pre-set aperture).

The hot bypass cathode inlet gas can be drawn from the cathode inlet gas fluid flow path prior to mixing of low temperature oxidant.

In other arrangements (e.g. higher power output systems), the hot bypass comprises a controllable restrictor.

The oxidant flow control means may be arranged to derive a reformer bypass air flow demand output signal from a reformer temperature input and a reformer setpoint input. Such a system may further comprising a tail-gas burner in fluid flow communication with the at least one fuel cell stack anode and cathode off-gas outlets, having a tail-gas burner exhaust, defining a fluid flow path from the at least one fuel cell stack anode and cathode off-gas outlets to the tail-gas burner exhaust to the exhaust and further comprising a tail-gas burner exhaust temperature sensor for sensing a tail-gas burner exhaust temperature ($T_{TGB}$). The oxidant flow control means are further arranged to derive a tail gas burner exhaust temperature setpoint from the reformer temperature input and the reformer setpoint input.

The system may further comprise tail gas burner control means for providing a fuel demand actuator command derived from the tail gas burner exhaust temperature setpoint and the tail-gas burner exhaust temperature, so as to increase supply of fuel to the tail gas burner when the tail-gas burner exhaust temperature is below the tail gas burner exhaust temperature setpoint as provided by the oxidant flow control means.

First and second oxidant mixers may be provided. The first mixer is arranged for mixing low temperature oxidant from an oxidant inlet at an inlet to the reformer heat exchanger and the second mixer is arranged for mixing low temperature oxidant from an oxidant inlet at a reformer heat exchanger outlet and cathode inlet.

The cathode inlet gas fluid flow path preferably has a temperature of 750-850 Deg C. at its hottest point in steady state operation at ambient temperature air input.

$T_1$ is preferably controlled to be between 50 and 150 Deg C. higher than $T_3$ in steady state operation at ambient temperature air input.

$T_1$ is preferably controlled to be between 500 and 600 Deg C. in steady state operation at ambient temperature air input.

$T_3$ is preferably controlled to be between 400 and 500 Deg C. in steady state operation at ambient temperature air input.

Reference herein to method steps is also reference to the system of the present invention adapted or configured to perform such method steps.

For the avoidance of doubt, references herein to parallel flow heat exchangers are to co-flow heat exchangers.

Preferably, the at least one fuel cell stack is a metal-supported IT-SOFC stack, more preferably as taught in U.S. Pat. No. 6,794,075. Preferably, the IT-SOFC has a steady state operating temperature in the range 400 Deg C.-650 Deg C., more preferably 450 Deg C.-650 Deg C., more preferably 520-620 Deg C.

At least one oxidant heater located in said cathode inlet gas fluid flow path between said oxidant inlet and said reformer heat exchanger to maintain the cathode inlet gas temperature sensor at or about a predetermined temperature. Preferably, the cathode inlet gas temperature sensor is maintained within 5, 10, 15, 20, 25, 30, 35, 40, 45 or 50 Deg C. of the predetermined temperature, most preferably within 5 Deg C. of the predetermined temperature. Preferably, the cathode off-gas temperature sensor may be maintained within 5, 10, 15, 20, 25, 30, 35, 40, 45 or 50 Deg C. of the predetermined temperature, most preferably within 5 Deg C. of the predetermined temperature.

For illustrative purposes only, the figures only indicate a single fuel cell. In various embodiments, (not shown) multiple fuel cell stacks are provided, and in still further embodiments multiple fuel cell stacks each comprising multiple fuel cells are provided. It will be appreciated that the anode and cathode inlets, outlets (off-gas), ducting, manifolding, and temperature sensors and their configuration are modified as appropriate for such embodiments, and will be readily apparent to a person of ordinary skill in the art.

In the following embodiments, air is used as the oxidant. Any reference to "oxidant" elsewhere can therefore be construed as reference to "air" in the following embodiments, and vice versa.

DETAILED DESCRIPTION

Figure 4:
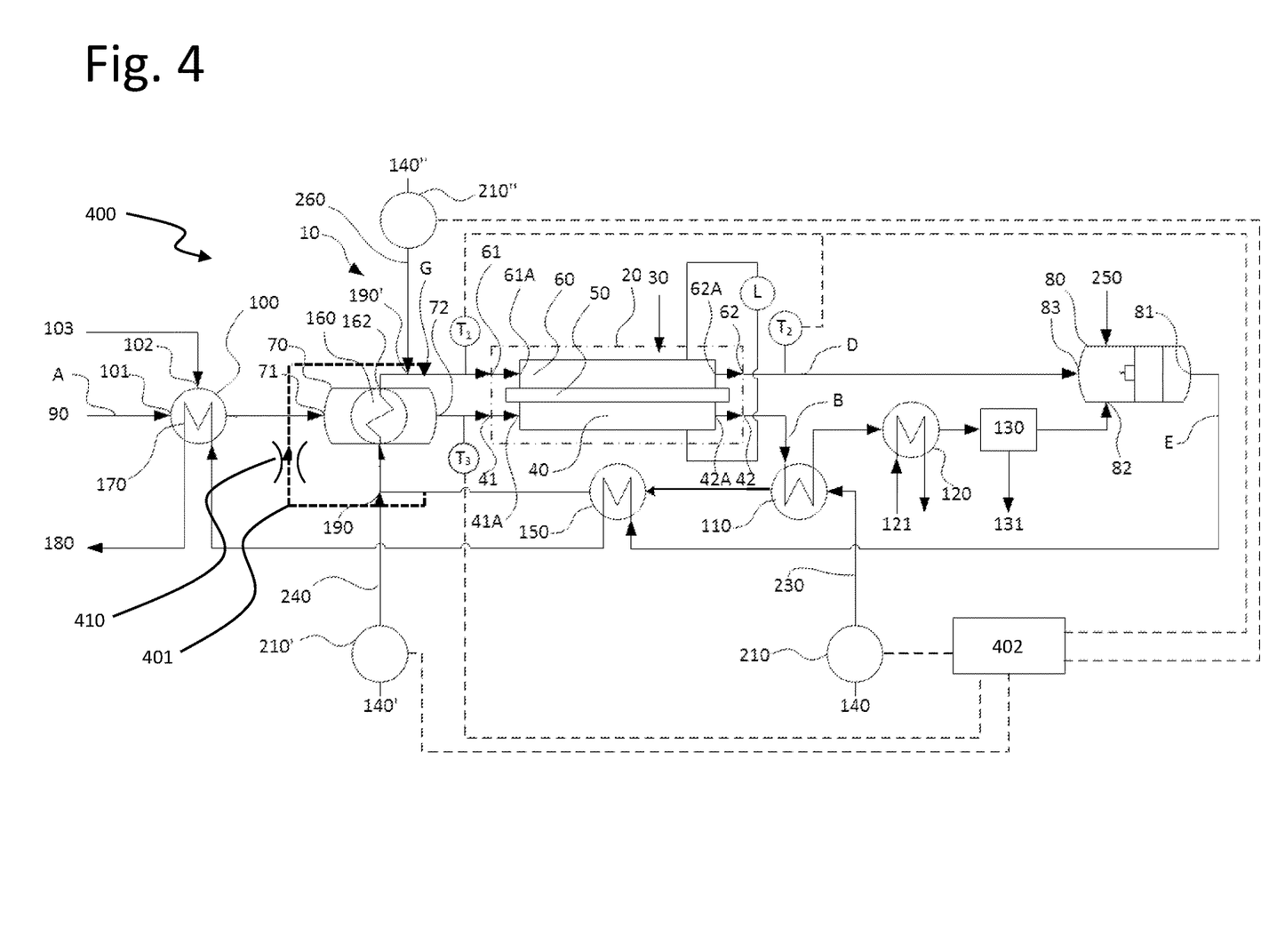
FIG. 4 shows a schematic of a fuel cell system in accordance with a preferred embodiment of the present invention.

Referring to FIG. 4, fuel cell system 400 is an intermediate-temperature solid oxide fuel cell (IT-SOFC) system. Fuel cell stack 20 is a metal-supported IT-SOFC fuel cell stack. Fuel cell system 400 has a steady state 1 kW electric output from fuel cell stack 20, and comprises 121 metal-supported IT-SOFC fuel cells 30. Each fuel cell 30 has an anode side 40, electrolyte layer 50, and cathode side 60. Each fuel cell layer in the fuel cell stack is separated by an electrically conducting gas impermeable metal interconnect plate (interconnector) (not shown). Fuel cell stack endplates and compression means (not shown) are also provided. Reference herein to fuel cell 30 is to the full set of 121 fuel cells 30.

Electrical load L is placed across fuel cell 30.

Fuel cell stack anode inlet 41 is in fluid flow communication with fuel cell anode inlet 41A for the flow of anode inlet gas to the anode side 40 of fuel cell 30. Fuel cell anode outlet 42A is in fluid flow communication with fuel cell stack anode off-gas outlet 42 for the flow of anode off-gas.

Fuel cell stack cathode inlet 61 is in fluid flow communication with fuel cell cathode inlet 61A for the flow of cathode inlet gas to the cathode side 60 of fuel cell 30. Fuel cell cathode outlet 62A is in fluid flow communication with fuel cell stack cathode off-gas outlet 62 for the flow of cathode off-gas.

Tail-gas burner 80 is in fluid flow communication with fuel cell stack anode and cathode off-gas outlets 42, 62 and has a tail gas burner exhaust 81, anode off-gas inlet 82 and cathode off-gas inlet 83. Tail-gas burner 80 defines a fluid flow path from fuel cell stack anode and cathode off-gas outlets 42, 62 to tail-gas burner exhaust 81, and is configured for burning anode and cathode off-gases and producing a tail-gas burner off-gas.

An anode inlet gas fluid flow path A is defined from fuel source 90 to evaporator 100 to steam reformer 70 to fuel cell stack anode inlet 41 to fuel cell anode inlet 41 A, i.e, the components are in fluid flow communication with one another.

An anode off-gas fluid flow path B is defined from fuel cell anode outlet 42A to fuel cell stack anode off-gas outlet 42 to anode off-gas heat exchanger 110 (HX-AOG) to condenser heat exchanger 120 to separator 130 to anode off-gas inlet 82 of tail-gas burner 80.

Main cathode inlet gas flow path 230 is defined from oxidant inlet 140 to blower 210 to anode off-gas heat exchanger 110 to air pre-heater heat exchanger 150 to reformer heat exchanger 160 to fuel cell stack cathode inlet 61 to fuel cell cathode inlet 61A. Air bypass inlet gas flow path 240 is defined from oxidant inlet 140' to blower 210' to air bypass inlet 190 to reformer heat exchanger 160 to fuel cell stack cathode inlet 61 to fuel cell cathode inlet 61A.

Air bypass inlet gas flow path 260 is defined from oxidant inlet 140" to blower 210" to air bypass inlet 190' to fuel cell stack cathode inlet 61 to fuel cell cathode inlet 61A. Thus the air bypass inlet gas flow path 260 meets the cathode inlet gas fluid flow path (C) at air bypass inlet 190' which is between the reformer heat exchanger 160 (and downstream of it) and the fuel cell stack cathode inlet 61, more particularly between the reformer heat exchanger oxidant outlet 162 and the fuel cell stack cathode inlet gas temperature sensor T1.

A cathode off-gas fluid flow path D is defined from fuel cell cathode outlet 62A to fuel cell stack cathode off-gas outlet 62 to cathode off-gas inlet 83 of tail-gas burner 80.

A tail-gas burner off-gas fluid flow path E is defined from tail gas burner exhaust 81 to air pre-heater heat exchanger 150 to evaporator heat exchanger 170 (HX-Evap) to fuel cell system exhaust 180. Anode off-gas heat exchanger 110 is in fluid flow communication with (i) fuel cell stack anode off-gas outlet 42 (i.e. with fuel cell anode outlet 42A) and tail-gas burner anode off-gas inlet 82, and (ii) oxidant inlet 140 and fuel cell stack cathode inlet 61 (i.e. with fuel cell cathode inlet 61A), and is arranged for exchanging heat between anode off-gas from fuel cell stack 20 and cathode inlet gas to fuel cell stack 20.

Air pre-heater heat exchanger 150 is in fluid flow communication with (i) tail-gas burner exhaust 81 and fuel cell system exhaust 180, and (ii) oxidant inlet 140 and fuel cell stack cathode inlet 61 (i.e. with fuel cell cathode inlet 61A), and is arranged for exchanging heat between tail-gas burner 81 off-gas and cathode inlet gas to fuel cell stack 20.

Reformer heat exchanger 160 may be a parallel-flow heat exchanger (other possibilities are described below) and is in fluid flow communication with (i) oxidant inlet 140 and fuel cell stack cathode inlet 61 (i.e. with fuel cell cathode inlet 61 A), and (ii) fuel source 90 and fuel cell stack anode inlet 41 (i.e. with fuel cell anode inlet 41A), and is arranged for exchanging heat between cathode inlet gas and anode inlet gas.

Evaporator 100 has a fuel inlet 101 for anode inlet gas from fuel source 90, a water inlet 102 for water from water supply 103, and an evaporator exhaust 104 of exhausting anode inlet gas from evaporator 100, and is located in the anode inlet gas fluid flow path between fuel source 90 and steam reformer 70. Evaporator 100 additionally comprises evaporator heat exchanger 170 located in the tail-gas burner off-gas fluid flow path E between air pre-heater heat exchanger 150 and fuel cell system exhaust 180.

Evaporator heat exchanger 170 is in fluid flow communication with (i) tail-gas burner exhaust 81 and fuel cell system exhaust 180, and (ii) fuel source 90 and water supply 103 and fuel cell stack anode inlet 41 (i.e. with fuel cell anode inlet 41 A), and is arranged to exchange heat between tail-gas burner off-gas and anode inlet gas and water, generating a steam fuel mix for the anode inlet gas to steam reformer 70.

Condenser heat exchanger 120 is in fluid flow communication with (i) fuel cell stack anode off-gas outlet 42 (i.e. fuel cell anode outlet 42A) and tail-gas burner anode off-gas inlet 82, and (ii) cooling circuit 121, and is arranged for exchanging heat between anode off-gas from fuel cell stack 20 and a cooling fluid in cooling circuit 121.

Separator 130 is located in the anode off-gas fluid flow path between condenser heat exchanger 120 and tail-gas burner 80, and has a separator condensate outlet 131, and is adapted to separate condensate from the anode off-gas fluid flow path, and exhaust the condensate via the condensate outlet 131.

Controller 402 has the same inputs and outputs as controller 200 of FIG. 1. It may be the same as controller 200 or may be modified vis-à-vis controller 200 as be described.

A hot cathode bypass 401 is provided, extending from the air outlet of air pre-heater heat exchanger 150 in path C direct to the anode inlet 61 of the fuel cell stack 20. This bypass allows a small amount of hot cathode inlet gas to bypass the reformer heat exchanger and contribute to elevating the cathode inlet gas to temperature at the cathode inlet. This bypass flow is small relative to the volume of cathode gas passing through heat exchanger 160.

Hot cathode bypass 401 preferably has a fixed restrictor or throttle 410. A variable throttle version is described further below.

Figure 5:
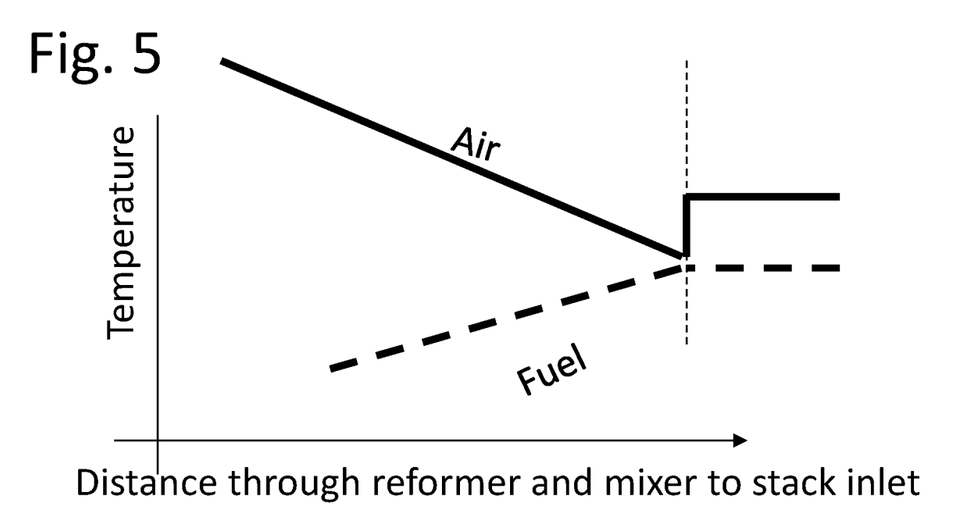
FIGS. 5 and 6 show temperature sketch diagrams illustrating temperature of air and fuel through the reformer of FIG. 4.

The effect of hot cathode bypass 401 is illustrated in FIG. 5. It allows for heating of the air to a greater temperature than the fuel at the outlet of the reformer heat exchanger so that T1 at the cathode inlet is greater than T3 at the anode inlet. This allows for more internal reforming in the fuel cell stack 20 without drop in stack voltage. This in turn allows total airflow to be lower, which means lower power to the blower, which means higher overall system efficiency.

Providing reformer outlet temperature to be lower than stack air inlet temperature is found to give rise to more optimal system performance.

The temperature T1 of the cathode inlet 61A can be controlled by addition of cool air from air inlet 140"; through control of blower 210".

Figure 6:
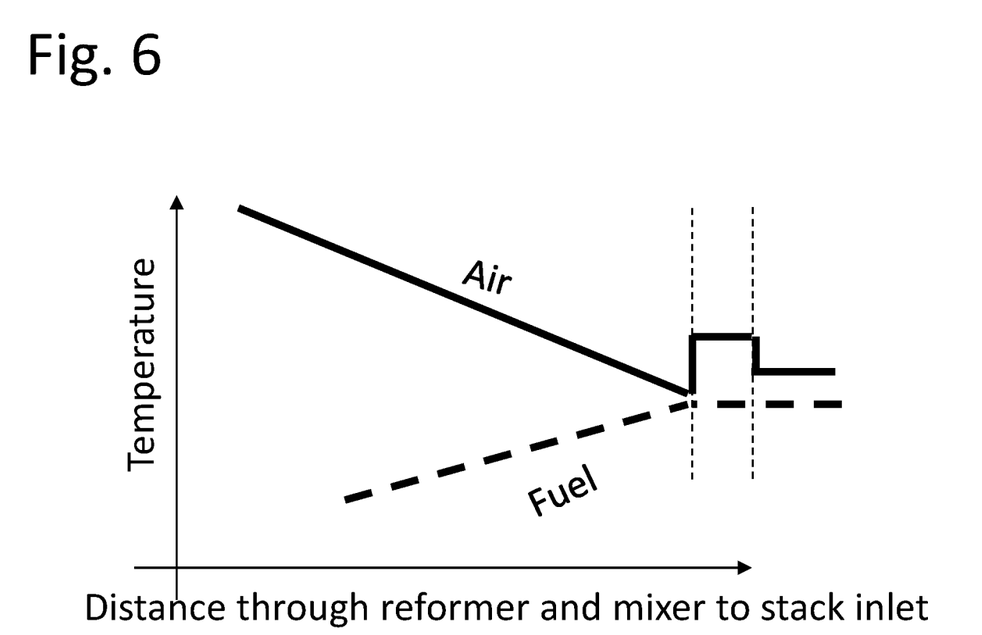

This is illustrated in FIG. 6, in which the cathode inlet gas fluid temperature falls as it passes through reformer heat exchanger 160, then rises with the mixing of hot bypass gas from bypass 401 and then falls, in a controlled manner, upon the mixing of air from air inlet 140".

Thus, as has been described, controller 402 can control the temperature T1 of the cathode inlet 61A by addition of cool air from air inlet 140", through control of blower 210", with the modification that this control takes place at a temperature above that fuel cell stack anode inlet 41.

Blowers 140 and 140' may be replaced by a single blower and an adjustable valve/separator (not shown) that can adjust the proportion of inlet oxidant passing along, on the one hand, main cathode inlet gas fluid flow path 230 and, on the other hand, bypass inlet gas flow path 240.

Figure 7:
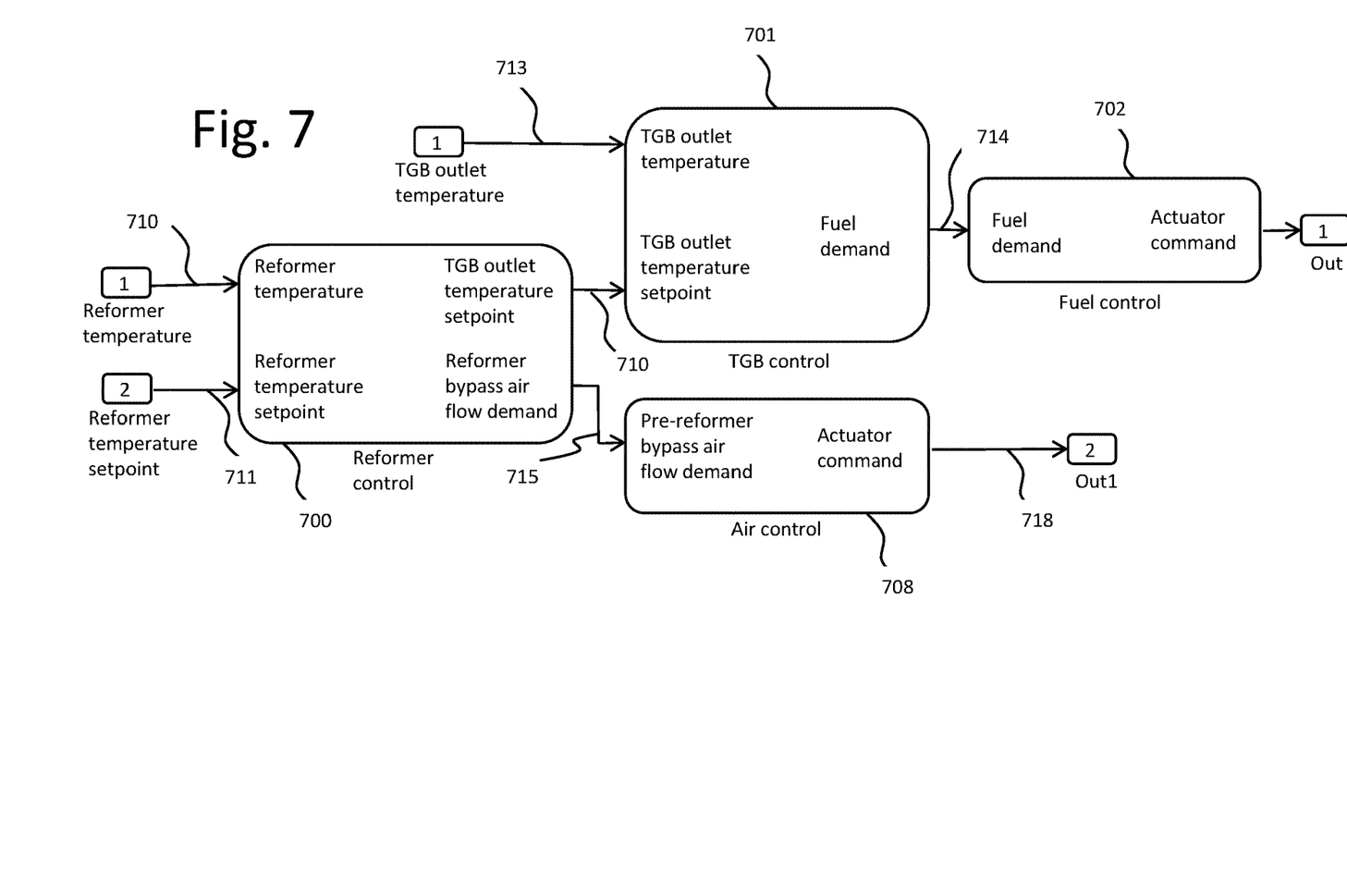
FIG. 7 illustrates control processes for controlling a fuel cell system in accordance with aspects of the invention.

FIG. 7 shows a modification to the control processes in controller 402 to achieve steady state operation of the apparatus of FIG. 4.

There is a reformer control process 700, a tail gas burner (TGB) process 701, a fuel control process 702 and an air control process 708.

The reformer control process takes as its inputs a reformer temperature 710 and a reformer temperature setpoint 711. The reformer temperature 710 is T3 measured at the reformer outlet 72 in FIGS. 1 and 4. The reformer control process delivers two outputs: a TGB output temperature setpoint 710 and a reformer bypass air flow demand 715.

The TGB control process 701 takes a TGB output temperature setpoint 710 as one of its inputs and a TGB outlet temperature 713 as another input and delivers a fuel demand output 714. The TGB outlet temperature is $T_{TGB}$ as measured at the TGB tailgas output 81 (FIGS. 1 and 4).

The fuel control process 702 takes the fuel demand output 714 as its input and converts this into an actuator control at its output to control supply of fresh fuel to the TGB from the fuel source 90 or 250 (FIG. 4) or fuel 82 that has passed through the reformer and stack, or a mixture of the two.

The air control process 708 takes the pre-reformer bypass air flow demand 715 as its input and converts this to an actuator control output 718. This control output controls valves 820 and 821 as well as blower 810. This is achieved in one of several alternative ways.

It may be desirable to keep either total airflow rate, main air flow rate or the post reformer bypass flow rate constant. For each of these cases more or less adjustment of the valve positions or blower speed will be required.

For example, it may be preferred to keep main air flow rate constant along path 230. In this case, valve 820 may be fixed and actuator control output 718 can control valve 821, with a corresponding adjustment to blower 810.

Alternatively, it may be preferred to keep post reformer bypass flow rate constant (along path 260) in which case, valve 821 may be fixed and actuator control output 718 can control valve 820, with a corresponding adjustment to blower 810.

Because of the difference in pressure drop in each of the flow paths it will generally be necessary to make some adjustment to both valves and blower.

Figure 8:
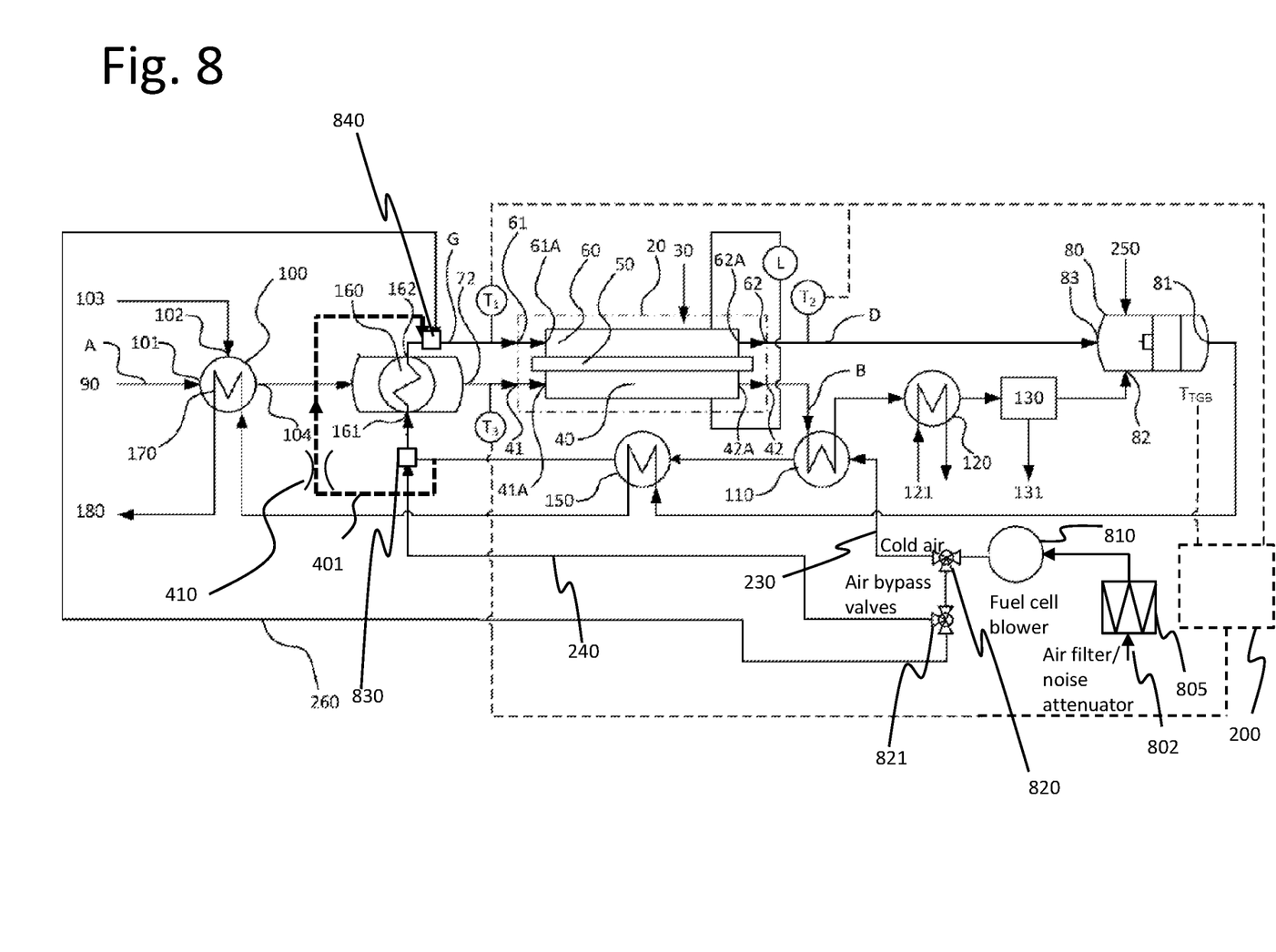
FIG. 8 shows a schematic of an alternative fuel cell system in accordance with the present invention

FIG. 8. shows a fuel cell module as already described with reference to FIG. 4, in which like elements are given like reference numerals. There is a common cold air source 802, an air filter/noise attenuator 805, a fuel cell blower 810 and first and second air bypass valves 820 and 821. First air bypass valve 820 controls supply of cold air to the anode off-gas heat exchanger 110. Second air bypass valve 821 controls air to the air bypass inlet gas flow paths 240 and 260. These valves control the proportion of air passed from the blower 810 to these three paths.

Ambient air at about 30 Deg C. passes to the anode off-gas heater where is first heated and then to the air preheater 150 where it is further heated. This is the hottest point in cathode inlet gas fluid flow path C. Air is heated to a high temperature primarily by exhaust from the tail gas burner may be about 800 to 900 Deg C.

This hot air is mixed in mixer 830 with cold air from air bypass path 240. The outlet air from mixer 830 may be between 500 and 600 Deg C. This passes through the reformer heat exchanger, causing the reformed fuel to heat to between about 400 and 500 Deg C., and the air exits from the reformer heat exchanger at a similar temperature (or to a temperature about 15 to 25 Deg C. above that temperature, but, as will be explained, it may exit at a temperature below that of the reformed fuel).

Between the reformer heat exchanger oxidant outlet 162 and the fuel cell stack cathode inlet 61 is a further mixer 840 that has bypass paths 260 as an inlet and has hot bypass 401 as another inlet. Hot bypass path has a throttle, choke or restrictor 410.

After mixing with cold air from bypass path 260 and hot air from hot bypass 401, the temperature at the fuel cell stack cathode inlet 61 is between about 500 and about 600 Deg C. Thus, the temperature T1 at the fuel cell stack cathode inlet 61 is greater than the temperature T3 at the fuel cell stack anode inlet 41.

All the air from the blower 810 is used, so the blower is used to its maximum efficiency. The fuel cell stack cathode and anode inlet temperatures can be carefully controlled by air bypass valves 820 and 821 and the power supplied to the blower 810 can be reduced to match the demands from these valves.

Figure 9:
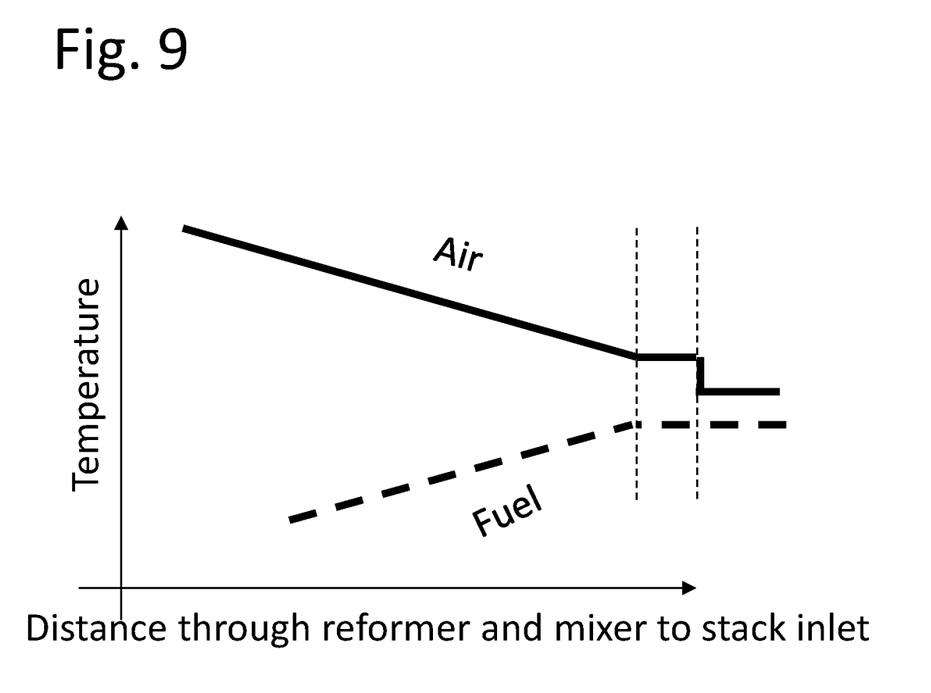
FIG. 9 is a temperature sketch diagrams illustrating temperature of air and fuel through a reformer in accordance with an alternative embodiment of the invention.

In an alternative embodiment, the hot bypass 401 is dispensed with, and the reformer heat exchanger is modified to heat the fuel to a temperature below that of the oxidant from the cathode inlet gas fluid flow path, prior to mixing with air from air bypass inlet gas flow path 260. The reformer heat exchanger 160 can, for example, be a foreshortened parallel flow heat exchanger that does not completely heat the fuel to the outlet temperature of the air. Alternatively, it can be a contra-flow heat exchanger in which there is a temperature difference between the primary (heating) and secondary (heated) paths at all points along those paths. Other arrangements are possible. Operation of such embodiments is illustrated in FIG. 9, which shows the fuel and air emerging from the reformer heat exchanger with the air hotter than the fuel and shows a temperature drop as the emerging air is mixed in a controlled manner with oxidant from the cathode inlet gas fluid flow path, under the control of the blower 210" (FIG. 4) or the bypass valve 821 (FIG. 8).

It has been explained that, in the preferred embodiment, the restrictor or throttle 410 is fixed. This is because controlling the flow of hot gas requires an expensive control valve that is prone to frequent maintenance or replacement. For this reason, in smaller systems, it is preferable to bring the temperature of the air exiting the reformer to a temperature above that of the fuel and then to cool it to the required temperature by mixing.

As an alternative, particularly in larger systems, the throttle 410 may be controlled by the controller 200 or 800 to allow just the required amount of hot cathode gas to bypass the reformer so as to bring the fuel cell stack cathode inlet 61 to the desired temperature above that of the fuel cell stack anode inlet 41. This arrangement may be preferable in systems generating more than 10 or 20 kW of power. In such systems, the energy saving from greater efficiency is such that the expense of hot flow control components may be outweighed by the energy savings.

In this way, a fuel cell system with a hot reformer bypass, and with cold pre- and post-reformer bypasses has been described and various alternative combinations of these (hot bypass with post-reformer bypass and no pre-reformer bypass; no hot bypass with post-reformer bypass and optional pre-reformer bypass; hot controllable bypass with post-reformer bypass and optional pre-reformer bypass). In some embodiments the fuel is heated in the reformer to a temperature below that of the oxidant at the reformer outlet. In the case, for example, of a counter flow reformer heat exchanger, the hot bypass flow would need to be greater, and the flow of cold pre ref bypass would be greater. These can indeed be advantageous in terms of lower pressure drops in the system or compactness.

System warm-up options may be provided in which a different type of reforming reaction is used other than steam reforming. For example, CPOX reforming can be used before reverting to SMR in normal operation. This would preferably include anode off gas recirculation. This would be implemented by taking some of the flow from stream 'B' at any point between the stack 20 and the TGB 80 and feeding it into the inlet of the reformer 70.

A related modification includes dispensing with the evaporator heat exchanger 170.

The present invention is not limited to the above embodiments only, and other embodiments will be readily apparent to one of ordinary skill in the art without departing from the scope of the appended claims.

The invention claimed is:
1. A fuel cell system comprising:
(i) at least one fuel cell stack comprising at least one intermediate-temperature solid oxide fuel cell, and having an anode inlet, a cathode inlet, an anode off-gas outlet, and a cathode off-gas outlet; and
(ii) a reformer for reforming a hydrocarbon fuel to a reformate, and having a reformer inlet for anode inlet gas, a reformer outlet for exhausting anode inlet gas, and a reformer heat exchanger;
(iii) a controller;
and defining:
(a) an anode inlet gas fluid flow path from a fuel source to said reformer to said at least one fuel cell stack anode inlet;
(b) an anode off-gas fluid flow path from said at least one fuel cell stack anode off-gas outlet to a fuel cell system exhaust;
(c) a cathode inlet gas fluid flow path from an at least one oxidant inlet through at least one cathode inlet gas heat exchanger to said reformer heat exchanger to said at least one fuel cell stack cathode inlet;
(d) a cathode off-gas fluid flow path from said at least one fuel cell stack cathode off-gas outlet to said fuel cell system exhaust; and
wherein said at least one cathode inlet gas heat exchanger is configured to heat relatively low temperature cathode inlet gas by the transfer of heat from at least one of (i) said anode off-gas fluid flow path, and (ii) said cathode off-gas fluid flow path, to provide relatively high temperature cathode inlet gas;
characterized in that said reformer heat exchanger is configured to heat said anode inlet gas from said relatively high temperature cathode inlet gas to a temperature $T_3$ at the anode inlet that is below a temperature $T_1$ at the cathode inlet; and further characterized by said controller controlling mixing of low temperature oxidant from the at least one oxidant inlet or each oxidant inlet with high temperature cathode inlet gas to control a temperature $T_1$ at the cathode inlet relative to a temperature $T_3$ at the anode inlet and at a level higher than $T_3$.

2. The system according to claim 1, wherein the controller is arranged to control mixing of low temperature oxidant from an oxidant inlet at the cathode inlet so as to reduce the temperature $T_1$.

3. The system according to claim 1, wherein the controller is arranged to control mixing of low temperature oxidant from an oxidant inlet at an input to the reformer heat exchanger so as to reduce the temperature $T_1$ while also reducing the temperature $T_3$.

4. The system according to claim 1, wherein the reformer heat exchanger comprises a hot bypass for cathode inlet gas to bypass the reformer heat exchanger and contribute to elevating said cathode inlet gas to temperature $T_1$ at the cathode inlet.

5. The system according to claim 4, wherein the hot bypass comprises a pre-set aperture restrictor.

6. The system according to claim 4, wherein the hot bypass cathode inlet gas is drawn from the cathode inlet gas fluid flow path prior to mixing of low temperature oxidant.

7. The system according to claim 4, wherein the hot bypass comprises a controllable restrictor.

8. The system according to claim 1, wherein the oxidant flow control means is arranged to derive a reformer bypass air flow demand output signal from a reformer temperature input, which indicates fuel temperature at the reformer outlet, and a reformer setpoint input.

9. The system according to claim 8 further comprising a tail-gas burner in fluid flow communication with said at least one fuel cell stack anode and cathode off-gas outlets, having a tail-gas burner exhaust, defining a fluid flow path from said at least one fuel cell stack anode and cathode off-gas outlets to said tail-gas burner exhaust to said exhaust and further comprising a tail-gas burner exhaust temperature sensor for sensing a tail-gas burner exhaust temperature ($T_{TGB}$), wherein said controller is further arranged to derive a tail gas burner exhaust temperature setpoint from the reformer temperature input and the reformer setpoint input.

10. The system according to claim 9 further comprising tail gas burner control means for providing a fuel demand actuator command derived from the tail gas burner exhaust temperature setpoint and the tail-gas burner exhaust temperature so as to increase supply of fuel to the tail gas burner when the tail-gas burner exhaust temperature is below the tail gas burner exhaust temperature setpoint as provided by the controller.

11. The system according to claim 1, comprising first and second oxidant mixers, the first mixer arranged for mixing low temperature oxidant from an oxidant inlet at an inlet to the reformer heat exchanger and the second mixer arranged for mixing low temperature oxidant from an oxidant inlet at a reformer heat exchanger outlet and cathode inlet.

12. The system according to claim 1, wherein the cathode inlet gas fluid flow path has a temperature of 750-850 degrees centigrade at its hottest point in steady state operation at ambient temperature air input.

13. The system according to claim 1, wherein $T_1$ is controlled to be between 50 and 150 degrees centigrade higher than $T_3$ in steady state operation at ambient temperature air input.

14. The system according to claim 1, wherein $T_1$ is controlled to be between 500 and 600 degrees centigrade in steady state operation at ambient temperature air input.

15. The system according to claim 1, wherein $T_3$ is controlled to be between 400 and 500 degrees centigrade in steady state operation at ambient temperature air input.

16. The system according to claim 1, wherein the reformer heat exchanger is a co-flow or parallel heat exchanger.

17. A method of operating a fuel cell having:
(i) at least one fuel cell stack comprising at least one intermediate-temperature solid oxide fuel cell, and having an anode inlet, a cathode inlet, an anode off-gas outlet, and a cathode off-gas outlet; and
(ii) a reformer for reforming a hydrocarbon fuel to a reformate, and having a reformer inlet for anode inlet gas, a reformer outlet for exhausting anode inlet gas, and a reformer heat exchanger;
(iii) a controller
and defining:
  (a) an anode inlet gas fluid flow path from a fuel source to said reformer to said at least one fuel cell stack anode inlet;
  (b) an anode off-gas fluid flow path from said at least one fuel cell stack anode off-gas outlet to a fuel cell system exhaust;
  (c) a cathode inlet gas fluid flow path from an at least one oxidant inlet through at least one cathode inlet gas heat exchanger to said reformer heat exchanger to said at least one fuel cell stack cathode inlet; and
  (d) a cathode off-gas fluid flow path from said at least one fuel cell stack cathode off-gas outlet to said fuel cell system exhaust; the method comprising:
    heating relatively low temperature cathode inlet gas by heat exchange from at least one of (i) said anode off-gas fluid flow path and (ii) said cathode off-gas fluid flow path, to provide relatively high temperature cathode inlet gas;
    heating said anode inlet gas from said relatively high temperature cathode inlet gas to a temperature $T_3$ at the anode inlet that is below a temperature $T_1$ at the cathode inlet; and
    using the controller, mixing of low temperature oxidant from the or each oxidant inlet with high temperature cathode inlet gas to control, at a level higher than $T_3$, the temperature $T_1$ at the cathode inlet.

18. A fuel cell system comprising:
(i) at least one fuel cell stack comprising at least one intermediate-temperature solid oxide fuel cell, and having an anode inlet, a cathode inlet, an anode off-gas outlet, and a cathode off-gas outlet; and
(ii) a reformer, optionally a steam reformer, for reforming a hydrocarbon fuel to a reformate, and having a reformer inlet for anode inlet gas, a reformer outlet for exhausting anode inlet gas, and a reformer heat exchanger;
and defining:
  (a) an anode inlet gas fluid flow path from a fuel source to said reformer to said at least one fuel cell stack anode inlet;
  (b) an anode off-gas fluid flow path from said at least one fuel cell stack anode off-gas outlet to a fuel cell system exhaust;
  (c) a cathode inlet gas fluid flow path from an at least one oxidant inlet through at least one cathode inlet gas heat exchanger to said reformer heat exchanger to said at least one fuel cell stack cathode inlet;
  (d) a cathode off-gas fluid flow path from said at least one fuel cell stack cathode off-gas outlet to said fuel cell system exhaust; and
  (e) a hot cathode gas bypass that extends from an air outlet of an air pre-heater heat exchanger, wherein the cathode gas bypass is configured to allow hot cathode inlet gas to bypass the reformer heat exchanger and elevate a cathode inlet gas temperature at the cathode inlet;
wherein said at least one cathode inlet gas heat exchanger is configured to heat relatively low temperature cathode inlet gas by the transfer of heat from at least one of (i) said anode off-gas fluid flow path, and (ii) said cathode off-gas fluid flow path, to provide relatively high temperature cathode inlet gas;
and wherein said reformer heat exchanger is configured to heat said anode inlet gas from said relatively high temperature cathode inlet gas to a temperature $T_3$ at the anode inlet that is below a temperature $T_1$ at the cathode inlet; and further characterized by an oxidant flow control means for controlled mixing of low temperature oxidant from an oxidant inlet with high temperature cathode inlet gas to control a temperature $T_1$ at the cathode inlet relative to a temperature $T_3$ at the anode inlet and at a level higher than $T_3$.

\* \* \* \* \*